United States Patent Office 3,524,069
Patented Aug. 11, 1970

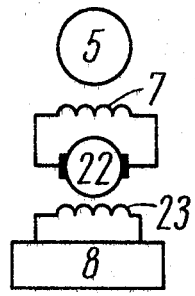
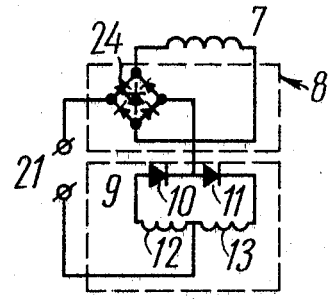
FIG. 2  FIG. 3
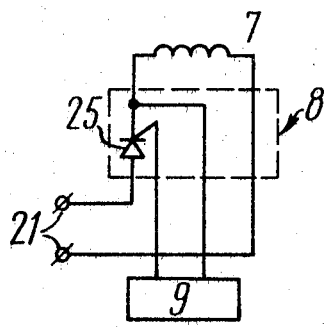
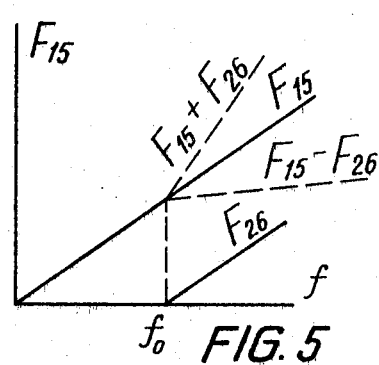
FIG. 4  FIG. 5
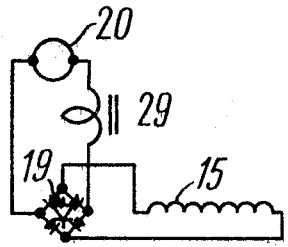
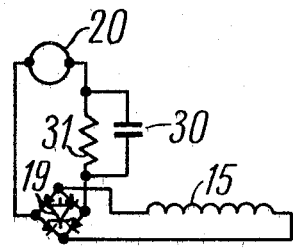
FIG. 6  FIG. 7

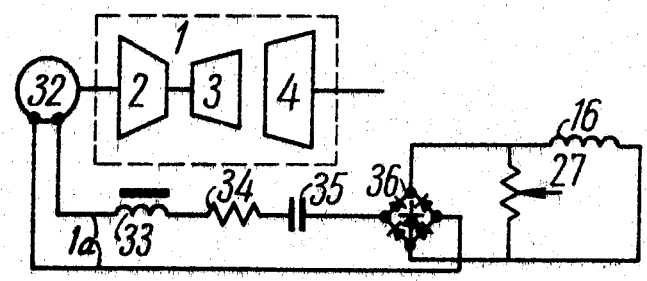
FIG. 8
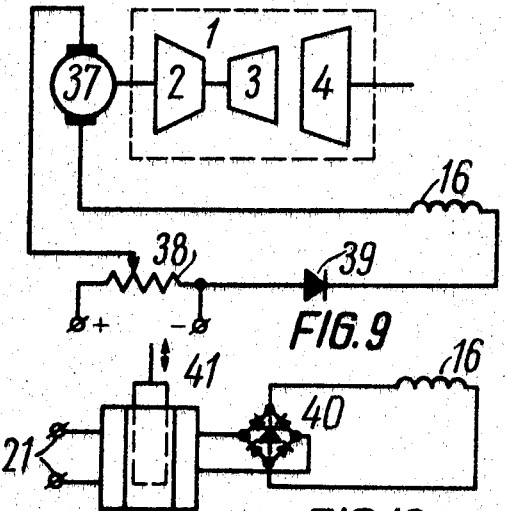
FIG. 9
FIG 10
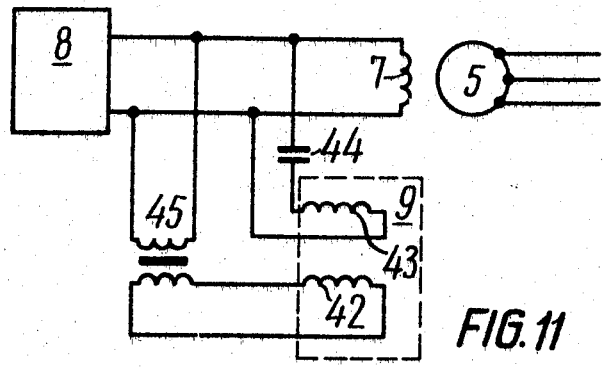
FIG. 11

3,524,069
DEVICE FOR CONTROLLING THE CURRENT OF THE ELECTRIC TRACTION MOTORS OF AN A.C. THERMAL-ELECTRIC DRIVE
Alexandr Dmitrievich Stepanov, 11 Parkovaya ulitsa, 44, korpus 1, kv. 182, Vitaly Ivanovich Anders, Tverskaya-Yamskaya ulitsa, 2/11, kv. 60, and Anatoly Vladimirovich Prokopovich, Aviamotornaya ulitsa, 4, korpus 5, kv. 355, all of Moscow, U.S.S.R.
Filed Feb. 28, 1967, Ser. No. 619,404
Int. Cl. B60l *11/08;* B61c *9/38*
U.S. Cl. 290—14          3 Claims

ABSTRACT OF THE DISCLOSURE

Devices for controlling the current of electrical traction motors of A.C. thermal-electrical drives such as motors in gas-turbine-electric locomotives, diesel-electric trains, tractors or the like in which is employed an electrical drive includng a synchronous generator and A.C. power traction electrical motors. Such devices are for controlling the current of the A.C. power traction electrical motors due to the mode of the thermal motor and electrical motors in the traction operation and provides for a maximum efficiency factor together with a maximum power factor of the electrical traction motors.

---

The present invention relates to devices for controlling the current of the electric traction motors of A.C. thermal-electric drives such as are employed in gas-turbine-electric locomotives, oil-electric locomotives, diesel-electric trains, tractors and the like wherein an electric drive incorporating a synchronous generator and A.C. traction motors is employed.

Thermal-electric drives for locomotives, e.g. gas-turbine electric locomotives, are known to be in use, these drives usually being made up of a two-shaft gas turbine set, a synchronous generator for supplying the traction induction motors and an exciter of the synchronous generator (see S. A. Gromov, L. A. Shevchenko "A.C. Gas - Turbine - Electric Locomotives," Bulletin of the VNIIZhT All-Union Railway Engineering Scientific Research Institute, 1962, No. 5).

The above mentioned drive does not provide for control of the current of the synchronous generator according to the conditions of operation of the prime mover and the induction motors.

An object of the present invention is to ensure of maximum efficiency of the drive depending upon the speed of the electric traction motors and output of the prime mover, this being attained by varying the conditions of operation (i.e., the voltage, current, magnetic flux) of the A.C. motors.

A favorable solution of said problems is attained in the system proposed herein for controlling the current of the A.C. traction motors supplied from the synchronous generator, wherein the field winding of the synchronous generator or its exciter is supplied from a source of alternating current through a rectifier connected to the output of a magnetic amplifier having at least three control windings. One of these control windings is connected through a rectifier to a current transformer inserted into the circuit of the electric drive, the second control winding is connected to a tachometer-generator coupled with the output shaft of the gas turbine set and the third control winding is connected to a tachometer-generator coupled with the input shaft of the gas turbine set or to an inductive converter linked with the handle of the engine-driver's controller. The first and second control windings of the magnetic amplifier have a cumulative connection, whereas the third winding is connected in opposition, i.e. differential, to them.

The current transformer connected to the first control winding may be either an alternating current transformer inserted into the circuit of the synchronous generator, or a direct current transformer connected to the field winding of the synchronous generator.

A nonlinear current versus frequency curve is obtained by providing the magnetic amplifier with a supplementary winding across which the difference in voltages of the tachometer-generator coupled with the output shaft of the gas turbine set and a potentiometer connected to the third control winding is applied. This also may be attained by inserting an inductive or capacitive reactance into the circuit of the second control winding of the magnetic amplifier.

The operation of the hereindescribed system can be stabilized by providing the magnetic amplifier with other supplementary windings connected to the field winding of the synchronous generator through a capacitor or a stabilizing transformer.

The invention will further be made clear from a specific description with reference to the accompanying drawings, in which:

FIG. 2 shows the synchronous generator field winding supplied from an exciter;

FIG. 3 shows the synchronous generator field winding supplied from an uncontrolled rectifier;

FIG. 4 shows the synchronous generator field winding supplied from a single-phase controlled rectifier;

FIG. 5 shows the magnetizing force curves of the magnetic amplifier windings;

FIG. 6 shows the supply circuit of the magnetic amplifier second winding connected via a choke coil;

FIG. 7 shows the supply circuit of the magnetic amplifier second winding connected via a capacitor;

FIG. 8 shows the magnetic amplifier third winding supplied from an A.C. tachometer-generator;

FIG. 9 shows the magnetic amplifier third winding supplied from a D.C. tachometer-generator;

FIG. 10 shows the magnetic amplifier third winding supplied from an inductive converter;

FIG. 11 shows the connection diagram of the magnetic amplifier supplementary windings for stabilizing the operation of the hereindescribed system.

Figure 1:
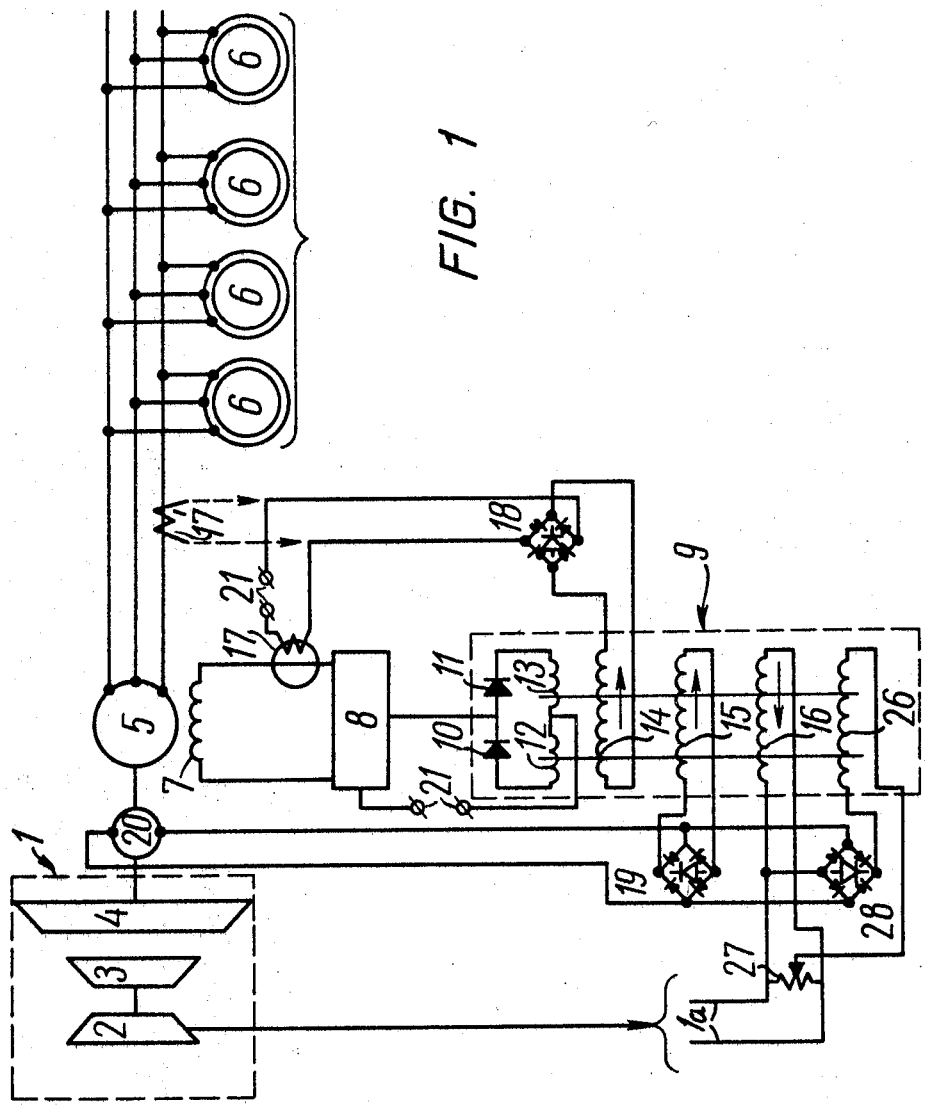
FIG. 1 shows the elementary circuit diagram of the herein proposed system as applied to a gas-turbine-electric locomotive equipped with a two-shaft gas turbine set.

As is seen from FIG. 1, the system of the present invention comprises a two-shaft gas-turbine set 1 made up of a compressor 2 driven by a compressor turbine 3 and a driving turbine 4 which imparts rotation to a synchronous generator 5.

The synchronous generator 5 supplies A.C. traction motors 6, the speed of the latter being controlled by changing current frequency "*f*" which is proportional to the speed "*n*" of the driving turbine 4.

The output of the gas turbine 1 is set by the position of the master controller (not shown in FIG. 1), this position corresponding to a certain rate of fuel supply and a certain speed of the input shaft of compressor turbine 3 when a multishaft primer mover is employed (e.g., a two-shaft gas turbine set).

At a given position of the master controller, the output power of the gas turbine set 1 varies in a definite manner with the speed of the output shaft of the driving turbine 4, connected with the synchronous generator 5 and, consequently, with the generated frequency. Each value of the speed of the output shaft of the driving turbine 4 and of the generated frequency corresponds to a definite optimum value of the current of an electric motor 6. At the given position of the master controller, the current of traction motors 6 drops according to a practically linear law with an increase of the generated frequency.

Calculations and experiments have shown that the synchronous generator 5 field current versus frequency curves at which optimum conditions of operation of the electric motors 6 are ensured are close to the electric motor 6 current versus synchronous generator 5 frequency curves.

The current of the electric traction motors 6 is varied by controlling the current flowing through a field winding 7 of the synchronous generator 5. To this end the field winding 7 is supplied from a rectifier 8 connected to the output of a magnetic amplifier 9.

The magnetic amplifier 9 has an internal positive feedback brought about by rectifiers 10 and 11 connected in series with operating windings 12 and 13. The magnetic amplifier 9 is provided with three control windings 14, 15, and 16; the control windings 14 and 15 have a cumulative connection, whereas winding 16 is connected in opposition to them (indicated in FIG. 1 by corresponding arrows).

As the synchronous generator 5 field current versus frequency curve is close to the electric motor 6 current versus synchronous generator 5 frequency curve, control winding 14 can be supplied either from a direct current transformer 17 inserted into the circuit of the field winding 7, or from an alternating current transformer 17' inserted into the stator circuit of the synchronous generator 5.

The control winding 14 is connected to either of the above mentioned transformers 17 and 17' through a rectifier bridge 18.

The magnetizing force of the control winding 14 is proportional to the current of the synchronous generator 5 or field winding 7 of synchronous generator 5. The control winding 15 is supplied through a rectifier 19 from a tachometer-generator 20 which is driven by the output shaft of the gas turbine set 1. The control winding 16 receives a signal responsive to a characteristic of the two-shaft gas turbine set 1. The rectifier 8 and magnetic amplifier 9 are supplied from a source of alternating current (terminals 21).

The field winding 7 of synchronous generator 5 may also be supplied from an exciter 22 (see FIG. 2), field winding 23 of the latter being connected to the output of the rectifier 8, whereas exciter 22 may be driven by turbine 3 or, alternatively, by a separate engine (not shown in FIG. 2) operating at a constant speed.

The rectifier 8 connected to the output of the magnetic amplifier 9 may be either of an uncontrolled type incorporating an uncontrolled rectifier bridge 24 (see FIG. 3), or of a controlled type with a controlled diode (thyristor) 25 (see FIG. 4), the control electrode of the latter being connected to the output of the magnetic amplifier 9. The controlled rectifier 8 may comprise a great variety of differential and bridge circuits with thyristors supplied from either single-phase or three-phase A.C. mains (terminals 21).

As the magnetic amplifier 9 is provided with an internal positive feedback, and presuming that its amplification factor is sufficiently high, it can be safely assumed under any operating conditions of the electric drive that $$F_{14}+F_{15} \approx F_{16}=\text{const.}$$

or that $$K_1 N_4 + K_2 I = \text{const.}$$

where $F_{14}$, $F_{15}$, $F_{16}$ are the magnetizing forces of control windings 14, 15, and 16;
$K_1$ and $K_2$ are proportionality factors;
$F_{14}=K_2 I$ is the magnetizing force of control winding 14;
$F_{15} \equiv K_1 N_4$ is the magnetizing force of control winding 15;
$N_4$ is the speed of rotation of the output shaft of driving turbine 4;
$I$ is the current flowing through the field winding 7 or the stator of synchronous generator 5.

At a constant value of the signal supplied according to a characteristic of the gas turbine set 1, magnetizing force $F_{16}$ of control winding 16 is at a constant level.

Consequently, the system of excitation of synchronous generator 5 maintains the required curves of the current versus frequency (or speed of driving turbine 4) at every position of the master controller.

In certain cases, such as are encountered at high frequencies of the current, it becomes necessary to maintain the current of the traction motors at a constant level. This is brought about by providing the magnetic amplifier 9 with a supplementary winding 26 (see FIG. 1) likewise supplied from the tachometer-generator 20 but with a voltage derived from a section of a potentiometer 27. Consequently, a flow of current is set up in winding 26 only when the voltage supplied from tachometer-generator 20 to rectifier bridge 28 is greater than the applied voltage and, as a result, magnetizing force $F_{16}$ of winding 26 arises only at frequencies exceeding "$f_0$" (see FIG. 5).

Such a connection of the control windings which may be of a greater number and of different magnetizing forces enables a broken current versus frequency curve to be obtained and, in particular, the current at an approximately constant level to be maintained within a certain range of frequencies.

It is also possible to obtain a non-linear current versus frequency curve by inserting a choke coil 29 (see FIG. 6) or a capacitor 30 with a resistor 31 (see FIG. 7) into the circuit of winding 15.

In order to improve the efficiency of operation of the electric drive at a drop of the speed of compressor turbine 3, the field current of synchronous generator 5 is to be varied in a certain manner. This is attained by varying the supply of the characteristic signal from the gas turbine set 1 to the control winding 16 according to a certain law. In cases when an A.C. tachometer-generator is mounted on the shaft of compressor turbine 3 (see FIG. 8), the signal is supplied to the control winding 16 through a resonance circuit made up of an inductance 33, resistance 34, capacitance 35 and rectifier bridge 36.

A proper selection of the values of parameters 33, 34, and 35 enables a dependence of the current flowing through the control winding 16 on the speed of compressor turbine 3 to be obtained at which the efficiency of operation of the electric drive is maximum.

A circuit made up of a D.C. tachometer-generator 37 (see FIG. 9) driven by the turbine 3, potentiometer 38 connected to a source of constant voltage (e.g., a storage battery) and rectifier 39 may be employed (instead of the resonance circuit) for supplying control winding 16. This also makes it possible to obtain the required dependence of the current flowing through the control winding 16 on the speed of compressor turbine 3.

In certain cases it is advisable to control the excitation of synchronous generator 5 according to the position of the fuel supply mechanism instead of the angular velocity of gas turbine set 1. To this end, the control winding 16 is connected through a rectifier bridge 40 (see FIG. 10) to the output of an inductive converter 41 of mechanical movement into an electric signal. At any change in the position of the fuel supply mechanism (for example, the rods of the fuel pumps), the signal supplied to the control winding 16 is correspondingly varied, thus bringing about a change in the field current of synchronous generator 5. The inductive converter 41 is supplied from a source of alternating current (therminals 21).

Whenever required, the magnetic amplifier 9 can be provided with supplementary control windings 42 and 43 (see FIG. 11) for ensuring steady operation of the herein described system, these windings being intended for receiving signals supplied from the field winding 7 of synchronous generator 5 through a capacitor 44 or a stabilizing transformer 45.

We claim:
1. A device for controlling the current of electric traction motors of an A.C. power thermal-electrical drive and more particularly a gas-turbine-electrical locomotive provided with a two shaft gas turbine set, comprising a synchronous generator driven by the gas turbine set and employed for supplying the A.C. traction motors, said synchronous generator having a field winding, a source of A.C. power, a rectifier connected to said power source for supplying the field winding of said synchronous generator, a magnetic amplifier fed from said power source, said magnetic amplifier having an output connected to said rectifier, a second rectifier, a current transformer having a primary circuit connected in the load current circuit of the electric motors, said magnetic amplifier having at least three windings, one of said windings being connected via said second rectifier to said current transformer, a tachometer-generator, the second winding of said magnetic amplifier being connected to said tachometer-generator measuring the speed of the synchronous generator or the frequency of the current via the rectifier, said first and second windings creating certain functions of the load current of the electric motors with respect to the frequency, and a signal dependent upon the power of the thermal motor which is fed into the third winding.

2. The device as claimed in claim 1 in which said magnetic amplifier includes a fourth winding connected to the difference of voltages taken from the tachometer-generator coupled to the output shaft of the gas-turbine set and a potentiometer connected to the third winding.

3. The device as claimed in claim 1 including an additional winding for said magnetic amplifier connected via a capacity or stabilizing transformer to clamps for the field winding of the generator.

References Cited
UNITED STATES PATENTS

| | | | |
|---|---|---|---|
| 2,909,779 | 10/1959 | Emery et al. | 290—40 XR |
| 2,929,243 | 3/1960 | Slamar | 318—146 XR |
| 3,183,422 | 5/1965 | Stamm | 290—40 XR |
| 3,189,809 | 6/1965 | Sueker | 318—146 XR |
| 3,263,142 | 7/1966 | Adoutte et al. | 318—143 XR |

GLEN R. SIMMONS, Primary Examiner

U.S. Cl. X.R.
318—144, 147